United States Patent
Do et al.

(10) Patent No.: US 11,748,132 B2
(45) Date of Patent: *Sep. 5, 2023

(54) APPARATUS AND METHOD FOR CONFIGURING AND ENABLING VIRTUAL APPLICATIONS

(71) Applicant: Telefonaktiebolaget LM Ericsson (publ), Stockholm (SE)

(72) Inventors: Hoang Do, Plano, TX (US); Sergey Odobetskiy, Oakville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 343 days.

This patent is subject to a terminal disclaimer.

(21) Appl. No.: 16/851,566

(22) Filed: Apr. 17, 2020

(65) Prior Publication Data

US 2020/0241913 A1     Jul. 30, 2020

Related U.S. Application Data

(63) Continuation of application No. 15/893,406, filed on Feb. 9, 2018, now Pat. No. 10,691,480.

(Continued)

(51) Int. Cl.
    *G06F 9/455*        (2018.01)
    *H04L 43/0817*    (2022.01)
    (Continued)

(52) U.S. Cl.
    CPC ............ *G06F 9/45558* (2013.01); *G06F 8/60* (2013.01); *G06F 8/61* (2013.01); *G06F 9/44505* (2013.01);
    (Continued)

(58) Field of Classification Search
None
See application file for complete search history.

(56) References Cited

U.S. PATENT DOCUMENTS 9,256,467 B1 *   2/2016   Singh .................... G06F 9/5005
2015/0381567 A1 *   12/2015   Johnson .............. H04L 63/0227
                                                                                             726/12

(Continued)

OTHER PUBLICATIONS

IEEE Std 802.1QTM, 2012 Edition, "Media Access Control (MAC) Bridges and Virtual Bridged Local Area Networks," Institute of Electrical and Electronics Engineers, Inc. Standard for Local and metropolitan area networks, Dec. 2012, 1782 pages.

(Continued)

*Primary Examiner* — Wynuel S Aquino
(74) *Attorney, Agent, or Firm* — Nicholson, De Vos, Webster & Elliott, LLP

(57) ABSTRACT

A method is implemented by a computing device to configure and monitor a virtual application in a cloud environment. The method includes generating instructions for configuring and monitoring the virtual application based on configuration data for the virtual application, modifying an injection virtual appliance image to include the instructions for configuring and monitoring the virtual application, where the injection virtual appliance image is a template for instantiating an injection virtual appliance (e.g., a software container or unikernel) that is to configure and monitor the virtual application according to the instructions, modifying a virtual application deployment descriptor for the virtual application to indicate that the injection virtual appliance is to be injected into the virtual application, and causing the virtual application, with the injection virtual appliance, to be deployed in the cloud environment using the modified virtual application deployment descriptor.

20 Claims, 6 Drawing Sheets

Related U.S. Application Data

(60) Provisional application No. 62/552,301, filed on Aug. 30, 2017.

(51) Int. Cl.

| | | |
|---|---|---|
| *G06F 8/61* | (2018.01) | |
| *H04L 41/5041* | (2022.01) | |
| *H04L 41/50* | (2022.01) | |
| *H04L 41/0806* | (2022.01) | |
| *G06F 8/60* | (2018.01) | |
| *G06F 9/445* | (2018.01) | |

(52) U.S. Cl.
CPC ...... *G06F 9/45529* (2013.01); *H04L 41/0806* (2013.01); *H04L 41/5048* (2013.01); *H04L 43/0817* (2013.01); *G06F 2009/45591* (2013.01); *G06F 2009/45595* (2013.01); *H04L 41/5096* (2013.01)

(56) References Cited

U.S. PATENT DOCUMENTS

| | | | | |
|---|---|---|---|---|
| 2016/0139902 | A1* | 5/2016 | Dimitrakos | G06F 8/61 717/120 |
| 2016/0154665 | A1* | 6/2016 | Iikura | H04L 41/0681 718/1 |
| 2016/0358193 | A1* | 12/2016 | Yunes | G06Q 30/0201 |
| 2018/0004576 | A1 | 1/2018 | Gokurakuji et al. | |
| 2018/0062938 | A1* | 3/2018 | Garrison | H04L 41/147 |
| 2018/0288129 | A1* | 10/2018 | Joshi | H04L 43/20 |
| 2019/0034219 | A1* | 1/2019 | Xu | G06F 9/45558 |

OTHER PUBLICATIONS

John, et al., "Meeting the Observability Challenges for VNFs in 5G systems," IFIP/IEEE IM 2017 Workshop: 2nd International Workshop on Management of 5G Networks-Short Paper, May 8, 2017, pp. 1127-1130.

Liu, et al., "Declarative Automated Cloud Resource Orchestration," ACM Symposium on Cloud Computing, Oct. 2011, 10 pages.

\* cited by examiner

APPARATUS AND METHOD FOR CONFIGURING AND ENABLING VIRTUAL APPLICATIONS

CROSS-REFERENCE TO RELATED APPLICATIONS

This application is a continuation of U.S. application Ser. No. 15/893,406 filed Feb. 9, 2018 (now U.S. patent application Ser. No. 10,691,480), which claims the benefit of U.S. Provisional Application No. 62/552,301 filed Aug. 30, 2017, which are hereby incorporated by reference.

TECHNICAL FIELD

The invention relates to the technical field of virtual applications, and more specifically to, configuring and monitoring a virtual application in a cloud environment.

BACKGROUND

A virtual application is an application that runs on a virtualized infrastructure. Virtual applications are typically implemented using a group of one or more virtual machines (VMs) deployed in a cloud environment that work together to perform certain high-level functions. The telecommunications industry uses the term Virtualized Network Functions, or VNFs, to refer to virtual applications that perform network functions.

Several virtual applications can be deployed in a cloud environment. Typically, each virtual application needs to be individually configured and monitored to ensure that the virtual application functions as intended. The data needed for configuring and monitoring each virtual application is typically collected manually. Also, the configuration and monitoring (e.g., health verification) of virtual applications are typically performed by one or more external centralized computer programs that send commands to the virtual applications via predefined interfaces.

There are several ways to configure a virtual application for deployment. These involve, for example, the use of platform scripts (e.g., bash), system interfaces (e.g., Representational State Transfer (REST) and Simple Object Access Protocol (SOAP)), and communication protocols (e.g., Secure Shell (SSH) and Hypertext Transfer Protocol (HTTP)). Many modern enterprise virtual applications are not designed to access shared cloud resources and typically allocate dedicated resources, such as networks. These networks are often private and not easily accessible from the cloud environment without customized, and often times manual, processes. A compatible platform script or computer program can be used to configure and monitor a virtual application, but this requires configuring network connectivity and access permissions (e.g., username/password and/or security certificate) to allow the platform script or computer program to access the virtual application. In a highly complex and secure enterprise cloud environment, a human operator must manually configure the network connectivity and access permissions prior to running the platform script or computer program.

Disadvantageously, the involvement of a human operator introduces a high risk of error and prolongs the amount of time it takes to configure and monitor the virtual application. This is because the human operator needs to be aware of and take into consideration dependencies among virtual applications, the environment in which the virtual application is to be deployed, the different requirements for each vendor and application type, and the different configuration and monitoring settings for each virtual application.

SUMMARY

A method is implemented by a computing device to configure and monitor a virtual application in a cloud environment. The method includes generating instructions for configuring and monitoring the virtual application based on configuration data for the virtual application, modifying an injection virtual machine (VM) image to include the instructions for configuring and monitoring the virtual application, where the injection VM image is a template for instantiating an injection VM that is to configure and monitor the virtual application according to the instructions, modifying a virtual application deployment descriptor for the virtual application to indicate that the injection VM is to be injected into the virtual application, and causing the virtual application, with the injection VM, to be deployed in the cloud environment using the modified virtual application deployment descriptor.

A computing device is adapted to configure and monitor a virtual application in a cloud environment. The computing device includes a non-transitory machine-readable storage medium having stored therein a virtual application injection component and a set of one or more processors to execute the virtual application injection component to cause the computing device to generate instructions for configuring and monitoring the virtual application based on configuration data for the virtual application, modify an injection virtual machine (VM) image to include the instructions for configuring and monitoring the virtual application, where the injection VM image is a template for instantiating an injection VM that is to configure and monitor the virtual application according to the instructions, modify a virtual application deployment descriptor for the virtual application to indicate that the injection VM is to be injected into the virtual application, and cause the virtual application, with the injection VM, to be deployed in the cloud environment using the modified virtual application deployment descriptor.

A non-transitory machine-readable medium has computer code stored therein, which when executed by a set of one or more processors of a computing device, causes the computing device to perform operations for configuring and monitoring a virtual application in a cloud environment. The operations include generating instructions for configuring and monitoring the virtual application based on configuration data for the virtual application, modifying an injection virtual machine (VM) image to include the instructions for configuring and monitoring the virtual application, where the injection VM image is a template for instantiating an injection VM that is to configure and monitor the virtual application according to the instructions, modifying a virtual application deployment descriptor for the virtual application to indicate that the injection VM is to be injected into the virtual application, and causing the virtual application, with the injection VM, to be deployed in the cloud environment using the modified virtual application deployment descriptor.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
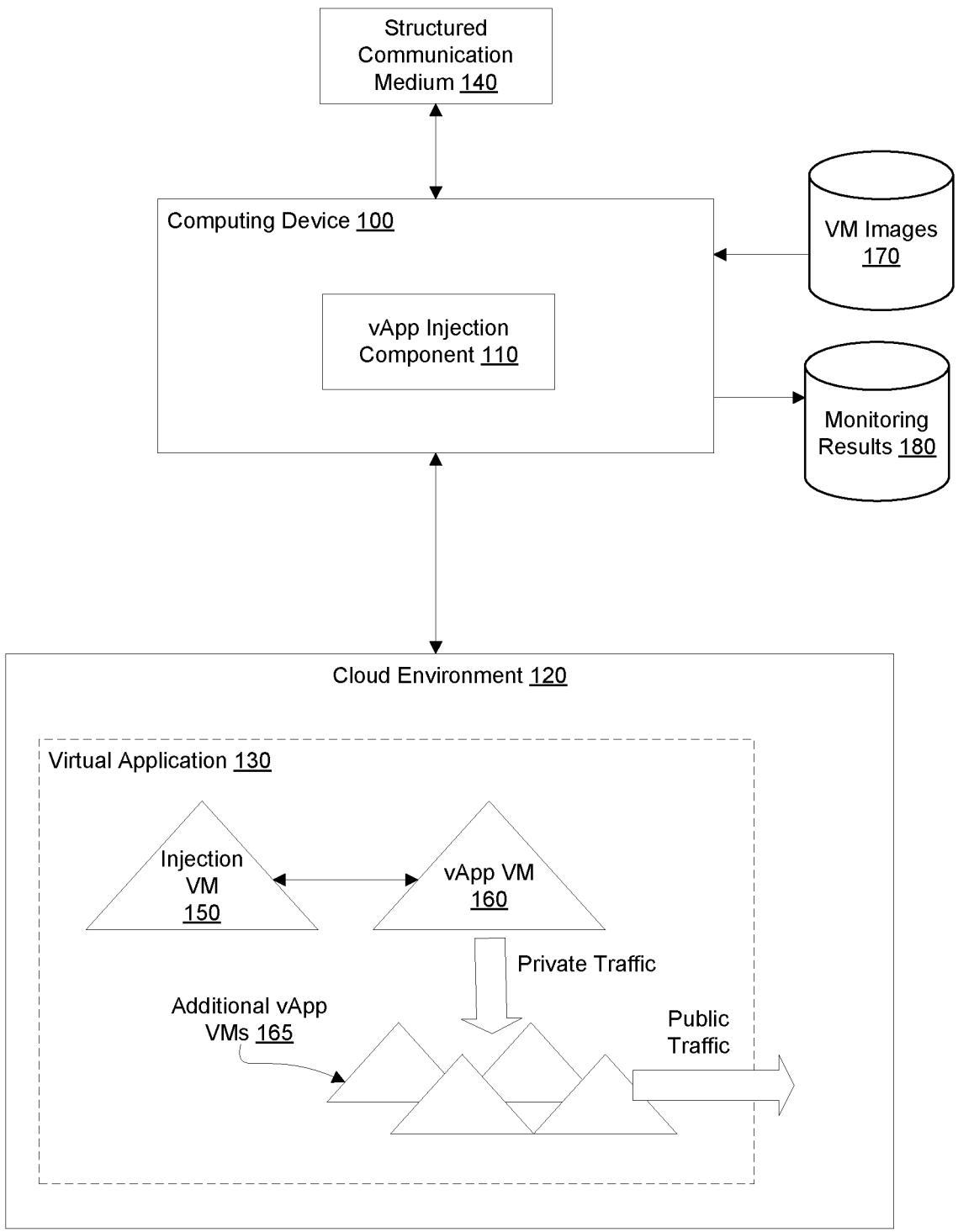
FIG. 1 is a block diagram of a system for configuring and monitoring a virtual application in a cloud environment, according to some embodiments.

The following description describes methods, apparatus, and systems for configuring and monitoring a virtual application in a cloud environment. According to some embodiments, a computing device generates instructions for configuring and monitoring the virtual application based on configuration data for the virtual application. The computing device modifies an injection virtual machine (VM) image to include the instructions for configuring and monitoring the virtual application, where the injection VM image is a template for instantiating an injection VM that is to configure and monitoring the virtual application according to the instructions. The computing device modifies a virtual application deployment descriptor for the application to indicate that the injection VM is to be injected into the virtual application. The computing device then causes the virtual application, with the injection VM injected therein, to be deployed in the cloud environment using the modified virtual application deployment descriptor. Once deployed, the injection VM configures and monitors the virtual application according to the instructions. Other embodiments are further described herein.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to certain embodiments. However, such notation should not be taken to mean that these are the only options or optional operations, and/or that blocks with solid borders are not optional in certain embodiments.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 1 is a block diagram of a system for configuring and monitoring a virtual application in a cloud environment, according to some embodiments.

As shown in the diagram, the system includes a computing device 100 communicatively coupled to a cloud environment 120 and a structured communication medium 140. The computing device 100 includes a virtual application (vApp) injection component 110. As will be described in additional detail herein, the virtual application injection component 110 is operable to cause a special-purpose VM (referred to herein as an "injection VM") to be injected into a virtual application 130 to configure and monitor the virtual application 130. This injection VM 150 can be deployed as part of the virtual application 130 itself (e.g., in the same resource group) to configure and monitor the virtual application 130. In one embodiment, the virtual application injection component 110 is implemented as software (e.g., computer code) that is executable by computing device 100. However, it should be understood that the virtual application injection component 110 can be implemented as any combination of hardware, firmware, and software. While the virtual application injection component 110 is shown as being implemented outside of the cloud environment 120, in some embodiments, the virtual application injection component 110 is implemented inside the cloud environment 120.

The cloud environment 120 is operable to provide cloud computing services. Cloud computing typically involves the provision of dynamically scalable and often virtualized resources such as virtualized computing resources, virtualized storage resources, and virtualized network resources. The virtualized resources can be used to implement one or more virtual applications 130 (e.g., a Virtual Network Function (VNF)) in the cloud environment 120. For example, a virtual application 130 can be implemented using one or more interconnected virtual machines (VMs).

The structured communication medium 140 is a communication medium over which a group of users/stakeholders can communicate in a structured manner (e.g., using a timeline or workflow). In one embodiment, the structured communication medium 140 is an automated workflow system or an electronic messaging system (e.g., an e-mail system). In an embodiment where the structured communication medium 140 is an e-mail system (e.g., Microsoft Outlook® e-mail system), the structured communication medium 140 may be implemented using a Post Office Protocol version 3 (POP3) mail server. A group of users can communicate via the structured communication medium 140 to generate the information that is needed to properly configure and monitor the virtual application 130. Such information is referred to herein as the configuration data for the virtual application 130. The configuration data may include, for example, information regarding where the virtual application 130 is to be deployed (e.g., which virtual data center or cloud environment 120), information regarding the virtual application 130 itself (e.g., VM images (or the locations of where those VM images are stored), a virtual application deployment descriptor for the virtual application 130 (e.g., a Heat Orchestration Template (HOT)), configuration files (e.g., eXtensible Markup Language (XML) files), license information (e.g., a license activation key), and/or VM connectivity parameters), information regarding where to store logs, statistics, and results, and information regarding the cloud manager that manages the cloud environment 120 in which the virtual application 130 is to be deployed.

In one embodiment, the virtual application injection component 110 is subscribed to the structured communication medium 140 and receives the configuration data for the virtual application 130 via the structured communication medium 140. In one embodiment, the configuration data is formatted using a known data representation format such as JavaScript Object Notation (JSON), Extensible Markup Language (XML), YAML Ain't Markup Language (YAML), or a proprietary format (this allows pieces of data to be easily extracted). In one embodiment, the virtual application injection component 110 extracts configuration data in the form of hyperlinks and/or attachments from messages (e.g., e-mails) sent via the structured communication medium 140. The virtual application injection component 110 may then generate instructions for configuring and monitoring the virtual application 130 based on the configuration data for the virtual application 130. Since the virtual application injection component 110 is privy to the configuration data for the virtual application 130, it knows how the virtual application 130 should be configured and monitored, and can generate the appropriate instructions for configuring and monitoring the virtual application 130 based on this knowledge. For example, the instructions may include an instruction to ping a particular VM that implements the virtual application 130 and/or an instruction to call an application programming interface (API) provided by the virtual application 130 and verify the response. As yet another example, the instructions may include an instruction to enable virtual application tracing, collect virtual application log file(s), and perform a virtual application health status check. As yet another example, the instructions may include an instruction to set the license activation key for the virtual application 130, activate the virtual application 130, and verify the health of the virtual application 130.

As mentioned above, an injection VM 150 can be injected into the virtual application 130 (so that is deployed as part of the virtual application 130) to configure and monitor the virtual application 130. An injection VM 150 can be instantiated using an injection VM image, which is a template for instantiating an injection VM 150. In one embodiment, the injection VM image includes a configuration execution program that can be executed to configure and monitor the virtual application 130 according to a set of instructions provided to it. In one embodiment, the virtual application injection component 110 obtains an injection VM image from a data store 170 and modifies/customizes it to include the instructions (e.g., that were generated based on the configuration data received via the structured communication medium 140) for configuring and monitoring the virtual application 130.

A virtual application 130 may be implemented using one or more virtual application VMs 160, 165. A virtual application VM 160 can be instantiated using a virtual application VM image, which is a template for instantiating a virtual application VM 160. In one embodiment, the virtual application injection component 110 obtains a virtual application VM image from a data store 170 and modifies/customizes it to include injection data. Injection data is data that is added to the virtual application VM image to facilitate the configuration and monitoring of the virtual application 130 or the virtual application VM 160. The injection data may include, for example, scripts (e.g., cloud-init script that is to be executed when the virtual application VM 160 is instantiated), configuration files, and/or security certificates/keys (e.g., a public key (e.g., injected into /root/ssh directory of virtual application VM image) that corresponds to a private key included in the injection VM image to enable secure communications between the virtual application VM 160 and the injection VM 150). In one embodiment, injection data is included in multiple virtual application VM images (so that multiple virtual application VMs 160, 165 can be instantiated with injection data).

A virtual application 130 may be deployed using a virtual application deployment descriptor (e.g., Heat Orchestration Template (HOT)). A virtual application deployment descriptor describes the infrastructure for a virtual application 130 (usually in a human-readable format). For example, the virtual application deployment descriptor may describe the various components of the virtual application 130 such as the VMs, the virtual networks, and the virtual storage that implement the virtual application 130, as well as the relationship between the components (e.g., how the components are interconnected). In one embodiment, the virtual application injection component 110 modifies a virtual application deployment descriptor for the virtual application 130 to indicate that the injection VM 150 is to be injected into the virtual application 130. In one embodiment, this is accomplished by adding a reference to the injection VM image in the virtual application deployment descriptor. This allows the injection VM 150 to be deployed as part of the virtual application 130 (and as part of the same resource group as the virtual application VMs 160, 165 that implement the virtual application 130).

The virtual application injection component 110 can cause the virtual application 130, with the injection VM 150 injected therein, to be deployed in the cloud environment 120 using the modified virtual application deployment descriptor. In one embodiment, this is accomplished by the virtual application injection component 110 providing the modified virtual application deployment descriptor to a cloud manager or a virtual infrastructure manager (e.g., OpenStack or VMware), which in turn deploys the virtual application 130 according to the description provided in the modified virtual application deployment descriptor. As shown in the diagram, the deployed virtual application 130 includes virtual application VMs 160 and 165, as well as the injection VM 150. The injection VM 150 can execute the configuration execution program to configure and monitor the virtual application 130 (e.g., by performing configuration and health verification tasks on the virtual application VM 160 that implements the virtual application 130 via a virtual network) according to the instructions that were included in the injection VM image (e.g., ping the virtual application VM 160 to verify that it is running, call an API provided by the virtual application 130 and verify the response, enable virtual application tracing and collection of logs, etc.). The injection VM 150 may then report the results of the configuration and monitoring to the virtual application injection component 110 (e.g., via a cloud manager). The virtual application injection component 110 may then report the results to users via the structured communication medium 140 and/or store the results in data store 180.

For purposes of illustration, the cloud environment 120 is shown as including a single virtual application 130. However, it should be understood that the typical cloud environment 120, during operation, will include more than one virtual application 130. Also, it should be understood that an injection VM 150 can be injected into multiple virtual application 130 (e.g., one injection VM 150 per virtual application 130) to configure and monitor those virtual applications 130.

By injecting the injection VM 150 into the virtual application 130 itself to configure and monitoring the virtual application 130, embodiments reduce the number of manual steps such as setting up network connectivity and access permissions (username/password and Secure Sockets Layer (SSL) security certificates). This reduces human error, lowers the cost of enabling virtual applications, and allows virtual applications to be deployed with a faster timeline. Also, injecting the injection VM 150 into the virtual application 130 addresses communication and security concerns, as the injection VM 150 is part of the same resource group as the virtual application VMs 160, 165 that implement the virtual application 130 (e.g., injection VM 150 uses same networking protocols and channels as the virtual application VMs 160).

Embodiments can be seen as taking a distributed approach to configuring and monitoring virtual applications 130 by injecting, into the virtual applications, injection VMs 150 that are responsible for performing configuration and monitoring tasks for their respective virtual applications 130. This is in contrast to the conventional approach where a centralized entity is typically responsible for configuring and monitoring many, and often times disparate, virtual applications 130, which is complex to manage and does not scale well.

Exemplary operations for configuring and monitoring a virtual application 130 using an injection VM 150 are described below.

Users communicate via the structured communication medium 140 to generate the configuration data for the virtual application 130. This configuration data includes the information that is needed to configure and monitor the virtual application 130. The virtual application injection component 110 may be subscribed to the structured communication medium 140 so that it can receive the configuration data for the virtual application 130 (e.g., via a POP3 mail server).

The virtual application injection component 110 then generates instructions for configuring and monitoring the virtual application 130 based on the configuration data for the virtual application 130 that was received via the structured communication medium 140. The virtual application injection component 110 obtains an injection VM image from a data store 170 and modifies the injection VM image to include the instructions for configuring and monitoring the virtual application 130. The virtual application injection component 110 may also obtain one or more virtual application VM images and modify those virtual application VM images to include injection data. The virtual application injection component 110 then modifies the virtual application deployment descriptor for the virtual application 130 to indicate that the injection VM 150 is to be injected into the virtual application 130.

The virtual application injection component 110 then causes the virtual application 130, with the injection VM 150, to be deployed in the cloud environment 120. This can be accomplished, for example, by providing the modified virtual application deployment descriptor to a cloud manager or a virtual infrastructure manager. Once deployed, the injection VM 150 executes the configuration execution program to configure and monitor the virtual application according to the instructions (that were included in the injection VM image). The injection VM 150 reports the results of the configuration and/or monitoring to the virtual application injection component 110 (e.g., via a cloud manager). This could include various statistics and/or error logs that were generated as part of configuring and monitoring the virtual application 130. The virtual application injection component 110 may then store the results in a data store 180 accessible to users. Additionally or alternatively, the virtual application injection component 110 and/or the injection VM 150 may report the results to users via the structured communication medium 140 (e.g., send the results to the POP3 mail server).

Figure 2:
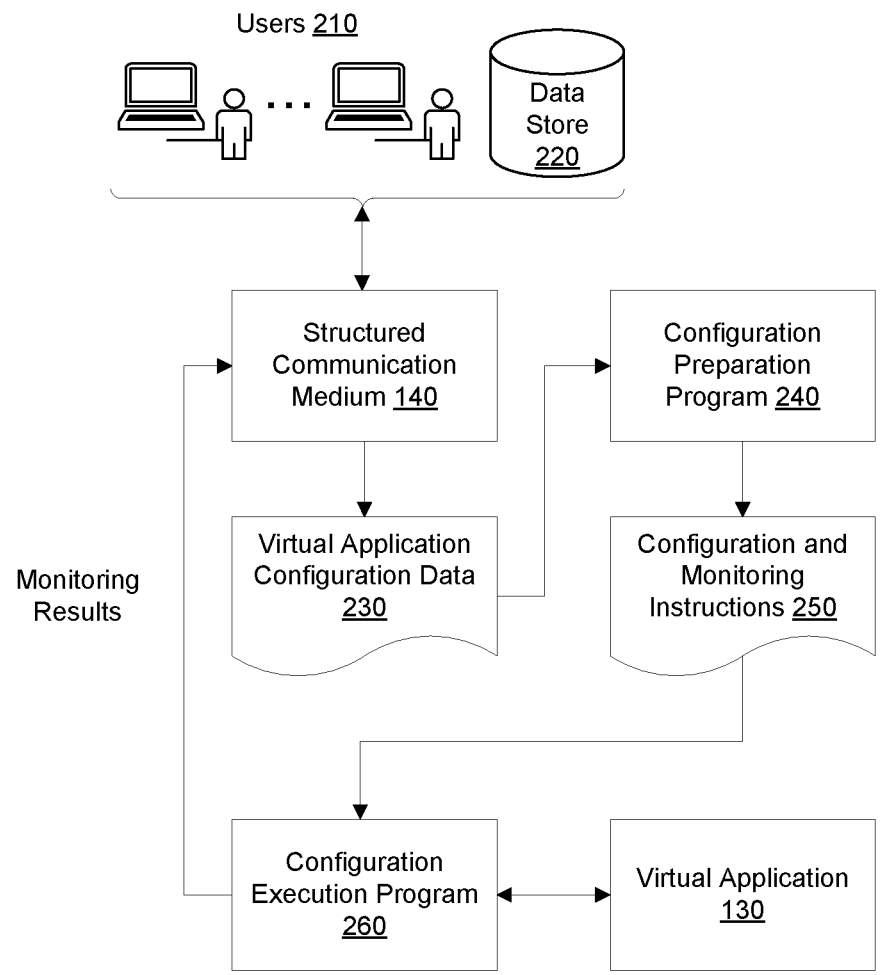
FIG. 2 is a diagram illustrating the interactions between the functional components of a system for configuring and monitoring a virtual application in a cloud environment, according to some embodiments.

FIG. 2 is a diagram illustrating the interactions between the functional components of a system for configuring and monitoring a virtual application in a cloud environment, according to some embodiments. Configuration data 230 for a virtual application 130 is collected from one or more users 210 and/or a data store 220 via the structured communication medium 140. The collected virtual application configuration data 230 is provided to the configuration preparation program 240 (which may be implemented as part of the virtual application injection component 110), which generates instructions 250 for configuring and monitoring the virtual application 130 based on the configuration data 230 for the virtual application 130.

The instructions 250 for configuring and monitoring the virtual application 130 are provided to the configuration execution program 260 (e.g., which is executed by the injection VM 150), which configures and monitors the virtual application 130 according to the instructions. The results of configuring and monitoring the virtual application are sent to the users 210 via the structured communication medium 140.

Figure 3:
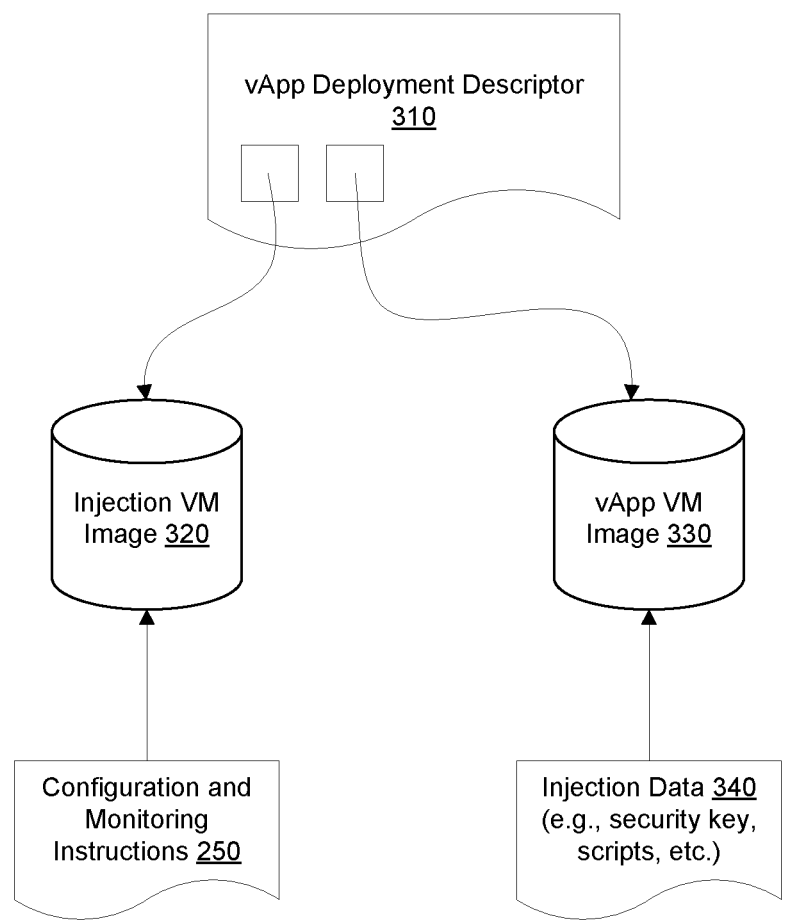
FIG. 3 is a diagram illustrating a virtual application deployment descriptor that is modified to include a reference to an injection VM image, according to some embodiments.

FIG. 3 is a diagram illustrating a virtual application deployment descriptor that is modified to include a reference to an injection VM image, according to some embodiments. A virtual application deployment descriptor 310 (e.g., HOT) describes the infrastructure for a virtual application 130. A virtual application deployment descriptor for a virtual application 130 typically includes a reference to one or more virtual application VM images (e.g., virtual application VM image 330) that implement the virtual application 130. The modified virtual application deployment descriptor 310 further includes a reference to an injection VM image 320 and this injection VM image 320 is modified/customized to include configuration and monitoring instructions 250. In one embodiment, one or more of the virtual application VM images 330 is modified to include injection data 340. The modified virtual application deployment descriptor 310 can be used to deploy the virtual application 130, with the addition of an injection VM 150 that is to configure and monitor the virtual application 130 according to the configuration and monitoring instructions 250.

Figure 4:
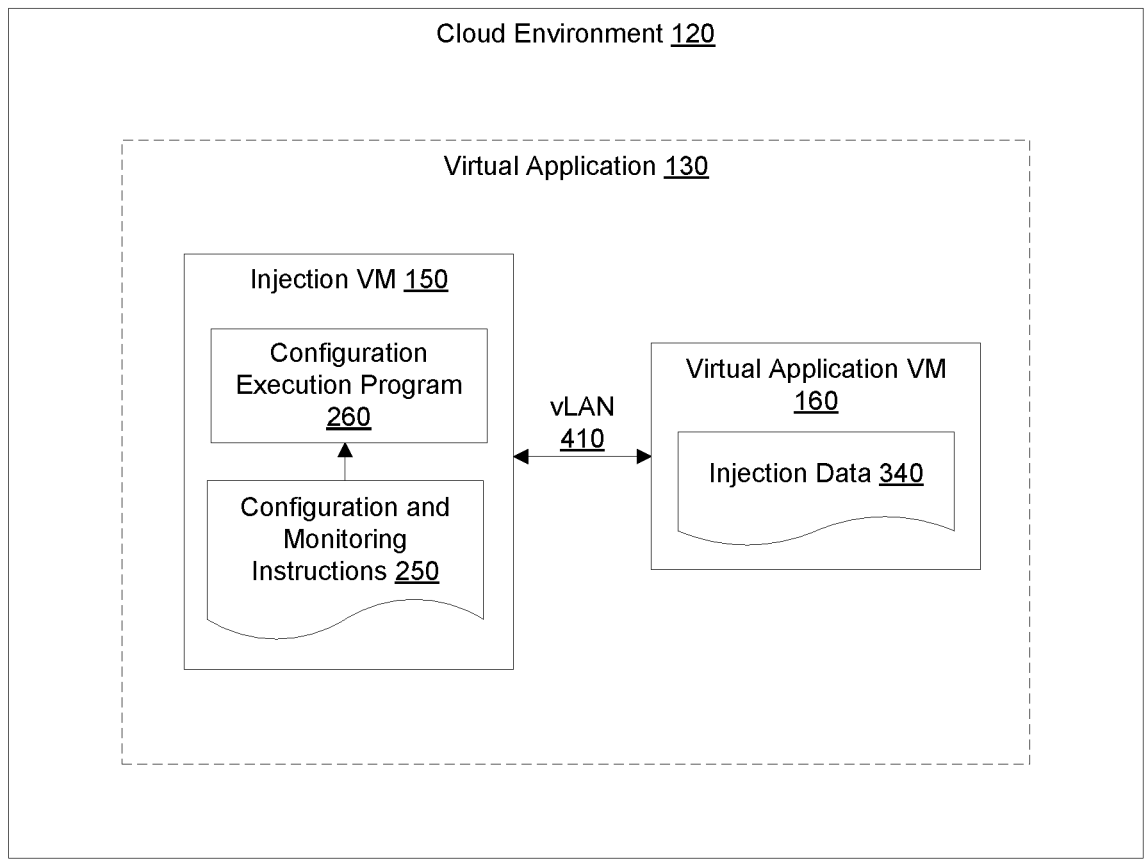
FIG. 4 is a diagram illustrating a virtual application that is deployed in a cloud environment with an injection VM, according to some embodiments.

FIG. 4 is a diagram illustrating a virtual application that is deployed in a cloud environment with an injection VM, according to some embodiments. As shown in the diagram, the virtual application 130 is deployed in a cloud environment 120. The virtual application 130 includes an injection VM 150 and a virtual application VM 160. The injection VM 150 includes a configuration execution program 260 and configuration and monitoring instructions 250. The virtual application VM 160 includes injection data 340. The injection VM 150 and the virtual application VM 160 are connected via virtual Local Area Network (vLAN) 410. The injection VM 150 can execute the configuration execution program 260 to configure and monitor the virtual application 130 (e.g., by configuring and monitoring virtual application VM 160) according to the provided configuration and monitoring instructions 250.

Figure 5:
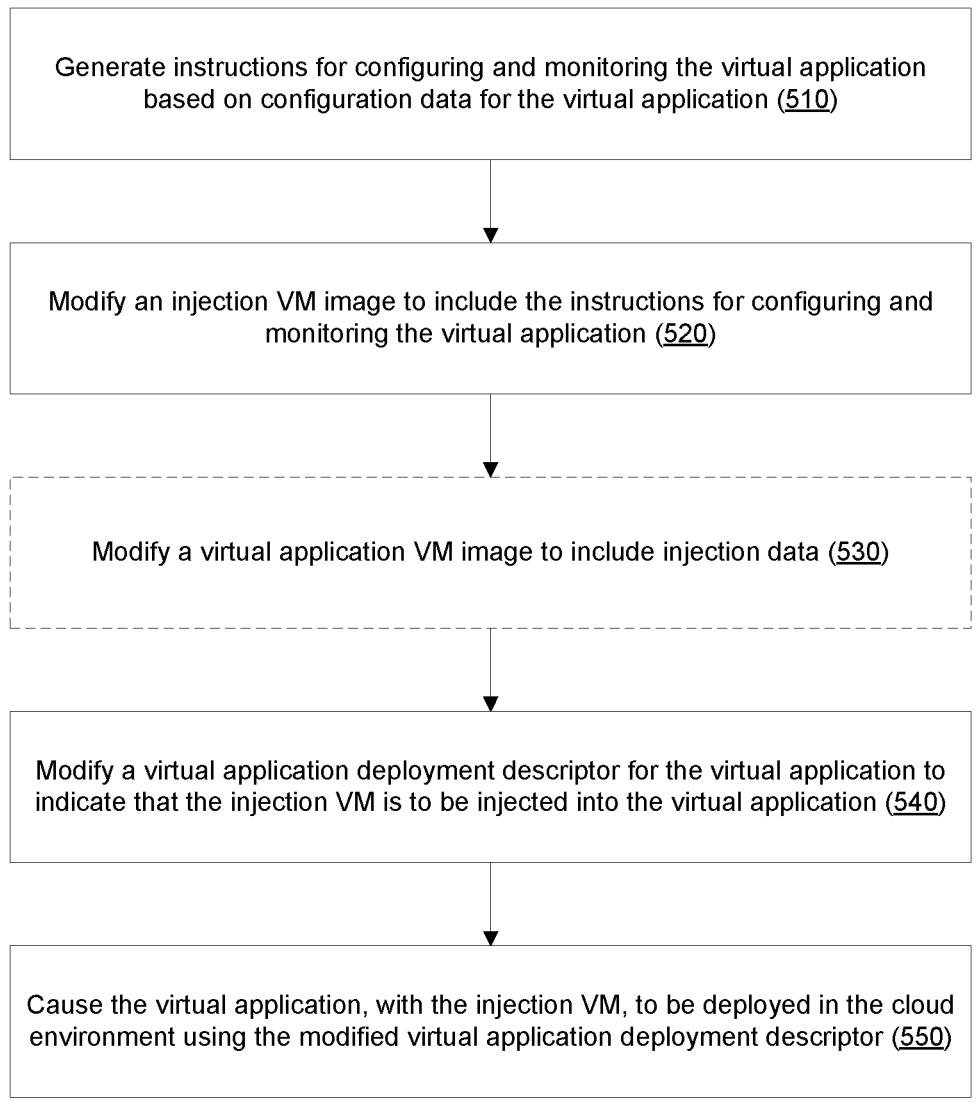
FIG. 5 is a flow diagram of a process for configuring and monitoring a virtual application in a cloud environment, according to some embodiments.

FIG. 5 is a flow diagram of a process for configuring and monitoring a virtual application in a cloud environment, according to some embodiments. In one embodiment, the process is performed by a computing device 100 (e.g., the virtual application injection component 110 of the computing device 100). The operations in the flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

The computing device 100 generates instructions for configuring and monitoring the virtual application 130 based on configuration data for the virtual application 130 (block 510). In one embodiment, the configuration data includes one or more of: information regarding where the virtual application 130 is to be deployed, information regarding where VM images (e.g., injection VM image and/or virtual application VM images) are stored, the virtual application deployment descriptor, information regarding where to store results of configuring and monitoring the virtual application 130, information regarding a cloud manager or virtual infrastructure manager that is to deploy the virtual application 130, and a license activation key. In one embodiment, the computing device 100 receives the configuration data via a structured communication medium 140. In one embodiment, the structured communication medium 140 is any one of: an automated workflow system and an electronic messaging system (e.g., an e-mail system).

The computing device 100 modifies an injection VM image to include the instructions for configuring and monitoring the virtual application 130 (block 520). The injection VM image is a template for instantiating an injection VM 150 that is to configure and monitor the virtual application 130 according to the instructions. In one embodiment, the injection VM image is configured to report a result of the configuring and monitoring (e.g., via the structured communication medium 140, to a data store 180, and/or to the computing device 100).

In one embodiment, the computing device 100 modifies a virtual application VM image to include injection data (block 530). The virtual application VM image is a template for instantiating a virtual application VM 160 that implements the virtual application 130. In one embodiment, the injection data includes a script, a configuration file, and/or a security certificate such as a public key that corresponds to a private key included in the injection VM image to enable secure communications between the virtual application VM 160 and the injection VM 150.

The computing device 100 modifies a virtual application deployment descriptor for the virtual application 130 to indicate that the injection VM 150 is to be injected into the virtual application 130 (block 540). In one embodiment, the computing device 100 modifies the virtual application deployment descriptor to indicate that the injection VM 150 is to be connected to a virtual application VM 160 that implements the virtual application 130 via a virtual network (e.g., a vLAN). In one embodiment, the injection VM 150 is configured to configure and monitor the virtual application 130 by performing configuration and health verification tasks on the virtual application VM 160 via the virtual network. The computing device 100 then causes the virtual application 130, with the injection VM 150, to be deployed in the cloud environment 120 using the modified virtual application deployment descriptor (block 550). Once deployed, the injection VM 150 configures and monitors the virtual application 130 according to the provided instructions and can report the results of the configuring and monitoring (e.g., to the computing device 100 or via the structured communication medium 140).

Figure 6A:
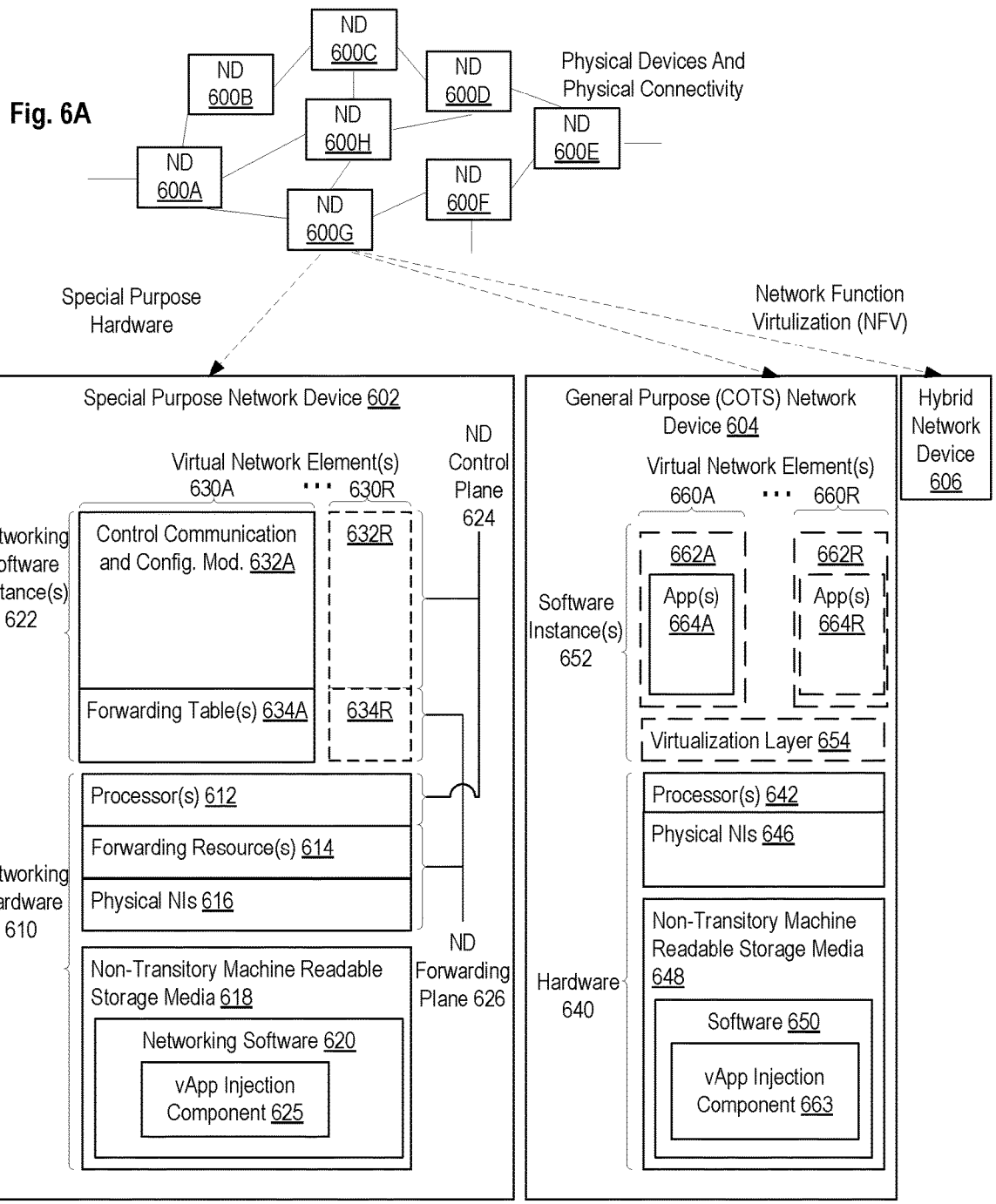
FIG. 6A illustrates connectivity between network devices (NDs) within an exemplary network, as well as three exemplary implementations of the NDs, according to some embodiments.

FIG. 6A illustrates connectivity between network devices (NDs) within an exemplary network, as well as three exemplary implementations of the NDs, according to some embodiments. FIG. 6A shows NDs 600A-H, and their connectivity by way of lines between 600A-600B, 600B-600C, 600C-600D, 600D-600E, 600E-600F, 600F-600G, and 600A-600G, as well as between 600H and each of 600A, 600C, 600D, and 600G. These NDs are physical devices, and the connectivity between these NDs can be wireless or wired (often referred to as a link). An additional line extending from NDs 600A, 600E, and 600F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a special-purpose operating system (OS); and 2) a general purpose network device 604 that uses common off-the-shelf (COTS) processors and a standard OS.

The special-purpose network device 602 includes networking hardware 610 comprising a set of one or more processor(s) 612, forwarding resource(s) 614 (which typically include one or more ASICs and/or network processors), and physical network interfaces (NIs) 616 (through which network connections are made, such as those shown by the connectivity between NDs 600A-H), as well as non-transitory machine readable storage media 618 having stored therein networking software 620. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

Software 620 can include code such as virtual application injection component 625, which when executed by networking hardware 610, causes the special-purpose network device 602 to perform operations of one or more embodiments described herein above as part networking software instances 622.

The special-purpose network device 602 is often physically and/or logically considered to include: 1) a ND control plane 624 (sometimes referred to as a control plane) comprising the processor(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the processor(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

Figure 6B:
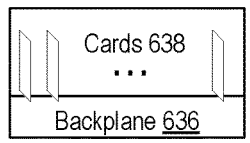
FIG. 6B illustrates an exemplary way to implement a special-purpose network device according to some embodiments.

FIG. 6B illustrates an exemplary way to implement the special-purpose network device 602 according to some embodiments. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and physical NIs 646, as well as non-transitory machine readable storage media 648 having stored therein software 650. During operation, the processor(s) 642 execute the software 650 to instantiate one or more sets of one or more applications 664A-R. While one embodiment does not implement virtualization, alternative embodiments may use different forms of virtualization. For example, in one such alternative embodiment the virtualization layer 654 represents the kernel of an operating system (or a shim executing on a base operating system) that allows for the creation of multiple instances 662A-R called software containers that may each be used to execute one (or more) of the sets of applications 664A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 654 represents a hypervisor (sometimes referred to as a virtual machine monitor (VMM)) or a hypervisor executing on top of a host operating system, and each of the sets of applications 664A-R is run on top of a guest operating system within an instance 662A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 640, directly on a hypervisor (in which case the unikernel is sometimes described as running within a LibOS virtual machine), or in a software container, embodiments can be implemented fully with unikernels running directly on a hypervisor represented by virtualization layer 654, unikernels running within software containers represented by instances 662A-R, or as a combination of unikernels and the above-described techniques (e.g., unikernels and virtual machines both run directly on a hypervisor, unikernels and sets of applications that are run in different software containers).

The instantiation of the one or more sets of one or more applications 664A-R, as well as virtualization if implemented, are collectively referred to as software instance(s) 652. Each set of applications 664A-R, corresponding virtualization construct (e.g., instance 662A-R) if implemented, and that part of the hardware 640 that executes them (be it hardware dedicated to that execution and/or time slices of hardware temporally shared), forms a separate virtual network element(s) 660A-R.

The virtual network element(s) 660A-R perform similar functionality to the virtual network element(s) 630A-R— e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments are illustrated with each instance 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 662A-R to VNEs also apply to embodiments where such a finer level of granularity and/or unikernels are used.

In certain embodiments, the virtualization layer 654 includes a virtual switch that provides similar forwarding services as a physical Ethernet switch. Specifically, this virtual switch forwards traffic between instances 662A-R and the physical NI(s) 646, as well as optionally between the instances 662A-R; in addition, this virtual switch may enforce network isolation between the VNEs 660A-R that by policy are not permitted to communicate with each other (e.g., by honoring virtual local area networks (VLANs)).

Software 650 can include code such as virtual application injection component 663, which when executed by processor(s) 642, cause the general purpose network device 604 to perform operations of one or more embodiments described herein above as part software instances 662A-R.

The third exemplary ND implementation in FIG. 6A is a hybrid network device 606, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments as described herein.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method by a computing device to configure and monitor a virtual application in a cloud environment, comprising:
    generating instructions for configuring and monitoring the virtual application based on configuration data for the virtual application;
    modifying an injection virtual appliance image to include the instructions for configuring and monitoring the virtual application, wherein the injection virtual appliance image is a template for instantiating an injection virtual appliance that is to configure and monitor the virtual application according to the instructions, wherein the instructions include activation instructions for setting a license activation key for the virtual application and activating the virtual application;
    modifying a virtual application deployment descriptor for the virtual application to indicate that the injection virtual appliance is to be injected into the virtual application, wherein the virtual application deployment descriptor includes a reference to an image of a virtual application virtual appliance;
    modifying the image of the virtual application virtual appliance to include injection data that is usable to facilitate configuring and monitoring of the virtual application, wherein the injection data includes a security key that enables encrypted communications between the virtual application virtual appliance and the injection virtual appliance; and
    causing the virtual application, with the injection virtual appliance, to be deployed in the cloud environment using the modified virtual application deployment descriptor, wherein when the virtual application is deployed, the injection virtual appliance sets the license activation key for the virtual application and activates the virtual application in accordance with the activation instructions.

2. The method of claim 1, wherein the image of the virtual application virtual appliance is a virtual machine image.

3. The method of claim 1, wherein the security key is a public key that corresponds to a private key included in the injection virtual appliance image.

4. The method of claim 1, further comprising:
    modifying the virtual application deployment descriptor to indicate that the injection virtual appliance is to be connected to a virtual application virtual appliance that implements the virtual application via a virtual network.

5. The method of claim 4, wherein the injection virtual appliance is configured to configure and monitor the virtual application by performing configuration and health verification tasks on the virtual application virtual appliance via the virtual network.

6. The method of claim 1, further comprising:
receiving the configuration data via a structured communication medium.

7. The method of claim 6, wherein the injection virtual appliance is configured to report a result of the configuring and monitoring via the structured communication medium.

8. The method of claim 6, wherein the structured communication medium is any one of: an automated workflow system and an electronic messaging system.

9. The method of claim 1, wherein the configuration data includes one or more of: information regarding where the virtual application is to be deployed, information regarding where virtual appliance images are stored, the virtual application deployment descriptor, information regarding where to store results of configuring and monitoring the virtual application, information regarding a cloud manager that is to deploy the virtual application, and the license activation key.

10. The method of claim 1, wherein the injection virtual appliance is any one of: a virtual machine, a software container, and a unikernel.

11. A computing device to configure and monitor a virtual application in a cloud environment, the computing device comprising:
a non-transitory machine-readable storage medium having stored therein a virtual application injection component; and
a set of one or more processors to execute the virtual application injection component to cause the computing device to generate instructions for configuring and monitoring the virtual application based on configuration data for the virtual application, modify an injection virtual appliance image to include the instructions for configuring and monitoring the virtual application, wherein the injection virtual appliance image is a template for instantiating an injection virtual appliance that is to configure and monitor the virtual application according to the instructions, wherein the instructions include activation instructions for setting a license activation key for the virtual application and activating the virtual application, modify a virtual application deployment descriptor for the virtual application to indicate that the injection virtual appliance is to be injected into the virtual application, wherein the virtual application deployment descriptor includes a reference to an image of a virtual application virtual appliance, modify the image of the virtual application virtual appliance to include injection data that is usable to facilitate configuring and monitoring of the virtual application, wherein the injection data includes a security key that enables encrypted communications between the virtual application virtual appliance and the injection virtual appliance, and cause the virtual application, with the injection virtual appliance, to be deployed in the cloud environment using the modified virtual application deployment descriptor, wherein when the virtual application is deployed, the injection virtual appliance sets the license activation key for the virtual application and activates the virtual application in accordance with the activation instructions.

12. The computing device of claim 11, wherein the image of the virtual application virtual appliance is a virtual machine image.

13. The computing device of claim 11, wherein the security key is a public key that corresponds to a private key included in the injection virtual appliance image.

14. The computing device of claim 11, wherein the virtual application injection component, when executed by the set of one or more processors, further causes the computing device to modify the virtual application deployment descriptor to indicate that the injection virtual appliance is to be connected to a virtual application virtual appliance that implements the virtual application via a virtual network.

15. The computing device of claim 14, wherein the injection virtual appliance is configured to configure and monitor the virtual application by performing configuration and health verification tasks on the virtual application virtual appliance via the virtual network.

16. The computing device of claim 11, wherein the injection virtual appliance is any one of: a virtual machine, a software container, and a unikernel.

17. A non-transitory machine-readable medium having computer code stored therein, which when executed by a set of one or more processors of a computing device, causes the computing device to perform operations for configuring and monitoring a virtual application in a cloud environment, the operations comprising:
generating instructions for configuring and monitoring the virtual application based on configuration data for the virtual application;
modifying an injection virtual appliance image to include the instructions for configuring and monitoring the virtual application, wherein the injection virtual appliance image is a template for instantiating an injection virtual appliance that is to configure and monitor the virtual application according to the instructions, wherein the instructions include activation instructions for setting a license activation key for the virtual application and activating the virtual application;
modifying a virtual application deployment descriptor for the virtual application to indicate that the injection virtual appliance is to be injected into the virtual application, wherein the virtual application deployment descriptor includes a reference to an image of a virtual application virtual appliance;
modifying the image of the virtual application virtual appliance to include injection data that is usable to facilitate configuring and monitoring of the virtual application, wherein the injection data includes a security key that enables encrypted communications between the virtual application virtual appliance and the injection virtual appliance; and
causing the virtual application, with the injection virtual appliance, to be deployed in the cloud environment using the modified virtual application deployment descriptor, wherein when the virtual application is deployed, the injection virtual appliance sets the license activation key for the virtual application and activates the virtual application in accordance with the activation instructions.

18. The non-transitory machine-readable medium of claim 17, wherein the image of the virtual application virtual appliance is a virtual machine image.

19. The non-transitory machine-readable medium of claim 17, wherein the security key is a public key that corresponds to a private key included in the injection virtual appliance.

20. The non-transitory machine-readable medium of claim 17, wherein the injection virtual appliance is any one of: a virtual machine, a software container, and a unikernel.

* * * * *